US005160654A

United States Patent [19]

Falou et al.

[11] Patent Number: 5,160,654

[45] **Date of Patent: * Nov. 3, 1992**

[54] LAUNDRY TREATMENT PRODUCT

[75] Inventors: Mohamad S. Falou, Cheadle; Timothy D. Finch, Wirral; Peter F. Garner-Gray, Preston; Andrew T. Hight, Spital; Martin M. Murphy, Bromborough; Geoffrey Newbold, Bebington; Ian E. Niven, Liverpool; Derek G. Savill, Ashton, all of England

[73] Assignee: Lever Brothers Company, Division of Conopco, Inc., New York, N.Y.

[ * ] Notice: The portion of the term of this patent subsequent to Jul. 21, 2009 has been disclaimed.

[21] Appl. No.: 566,635

[22] Filed: Aug. 13, 1990

[30] Foreign Application Priority Data

| | | | |
|---|---|---|---|
| Aug. 23, 1989 | [GB] | United Kingdom | 8919120 |
| Dec. 3, 1989 | [GB] | United Kingdom | 8927433 |

[51] Int. Cl.$^5$ ...................... C11D 17/00; C11D 7/18; C09K 3/00

[52] U.S. Cl. ...................................... 252/91; 252/94; 252/174.25; 252/186.27; 252/186.25

[58] Field of Search ...................... 252/91, 94, 174.25, 252/186.25, 186.27

[56] References Cited

U.S. PATENT DOCUMENTS

| | | | |
|---|---|---|---|
| 3,186,869 | 6/1965 | Friedman . | |
| 3,198,740 | 8/1965 | Dunlop et al. . | |
| 3,322,764 | 5/1967 | Metlesics et al. . | |
| 4,099,912 | 6/1978 | Ehrlich | 8/137 |
| 4,154,695 | 5/1979 | McCrudden et al. . | |
| 4,208,295 | 6/1980 | Sai | 252/94 |
| 4,253,842 | 3/1981 | Ehrlich . | |
| 4,325,933 | 4/1982 | Matsumoto et al. | 423/415 |
| 4,365,853 | 12/1982 | Ehrlich | 252/99 |
| 4,410,441 | 10/1988 | Davies | 206/0.5 |
| 4,416,791 | 11/1983 | Haq . | |
| 4,604,224 | 8/1986 | Cheng . | |
| 4,626,372 | 12/1986 | Kaufmann et al. . | |
| 4,751,015 | 6/1988 | Humphreys | 252/99 |
| 4,828,744 | 5/1989 | Kaufmann et al. | 252/99 |

FOREIGN PATENT DOCUMENTS

| | | |
|---|---|---|
| 0253566 | 1/1988 | European Pat. Off. . |
| 2424228 | 11/1979 | France . |
| 0836108 | 6/1960 | United Kingdom . |
| 1515299 | 6/1978 | United Kingdom . |

*Primary Examiner*—Paul Lieberman
*Assistant Examiner*—William S. Parks
*Attorney, Agent, or Firm*—Milton L. Honig

[57] ABSTRACT

A laundry treatment product, in the form of a sachet containing a particulate bleaching detergent composition containing sodium percarbonate, has at least two compartments to enable the sodium percarbonate to be segregated from certain other ingredients, particularly zeolites. The sachet product exhibits improved bleach stability on storage. Sachets of water-soluble polyvinyl alcohol film are not insolubilized in the wash liquor since no sodium perborate is present to generate insolubilizing borate ions.

7 Claims, 1 Drawing Sheet

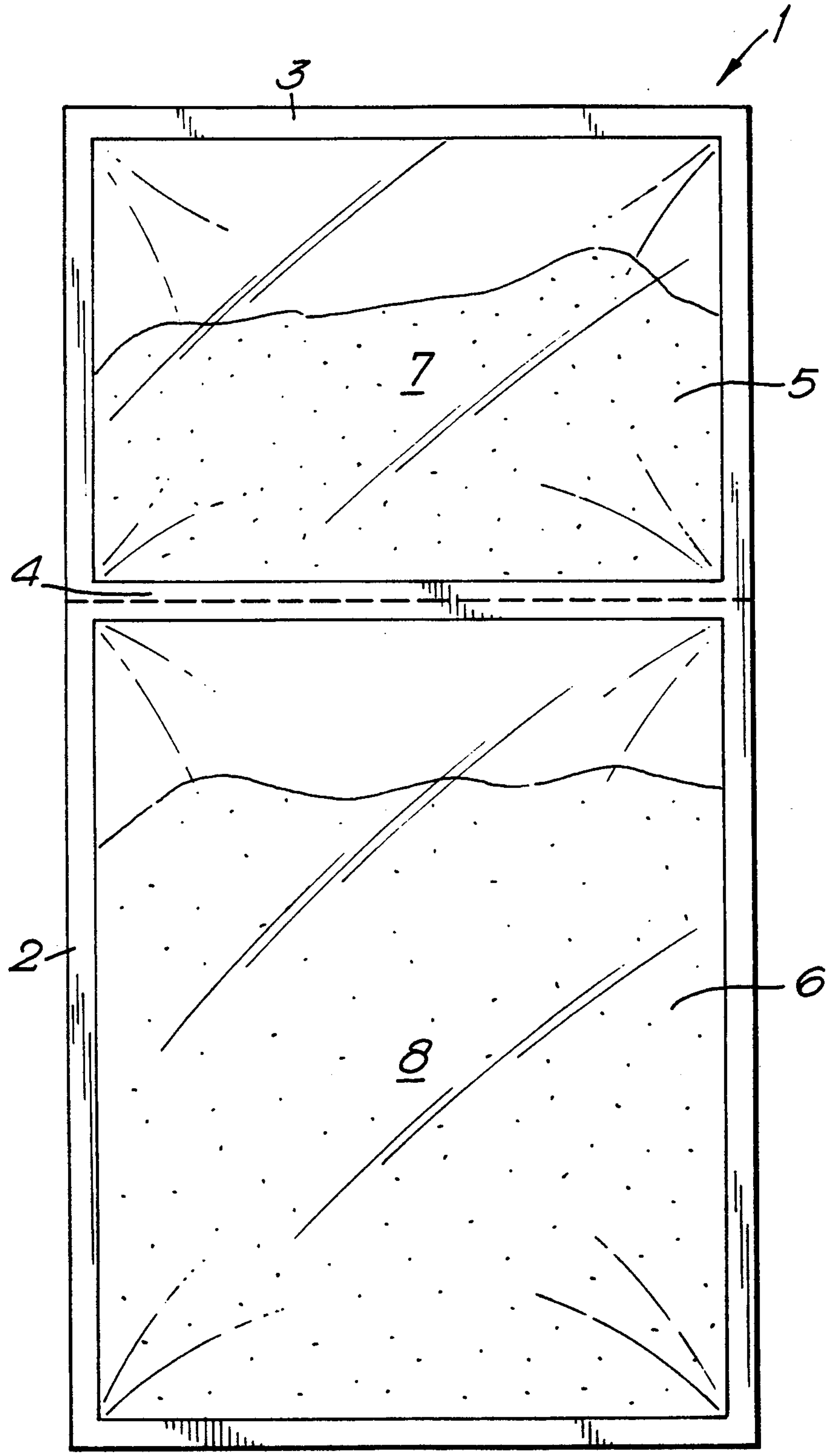
1
3
4
7
5
2
6
8

LAUNDRY TREATMENT PRODUCT

TECHNICAL FIELD

The present invention relates to a product for treating fabrics in a washing machine, in the form of a sachet having at least two compartments, and containing a particulate bleaching detergent composition which includes sodium percarbonate.

BACKGROUND AND PRIOR ART

Sodium percarbonate is a well-known bleaching ingredient in detergent compositions and is widely disclosed in the literature, although in recent years its use in commercial products has been abandoned in favour of sodium perborate. Sodium percarbonate is less stable than sodium perborate in the presence of moisture, and its stabilisation in detergent powders has long been recognised as a problem to which various solutions have been suggested; for example, GB 1 515 299 discloses the stabilisation of sodium percarbonate in a detergent composition by admixture with a perfume diluent, for example, dibutyl phthalate.

The problem becomes especially acute if sodium percarbonate is to be included in a detergent powder with a high free moisture content, when it tends to become deactivated on storage. This situation applies in particular to powders containing crystalline alkali metal aluminosilicates (zeolites), because those materials contain a large amount (about 10–15 wt % in zeolite 4A, for example) of relatively mobile water.

Detergent compositions containing alkali metal aluminosilicate (type 4A zeolite) and sodium percarbonate are disclosed in DE 2 656 009A (Colgate), in Examples 1 and 2, but storage stability is not discussed. According to GB 2 013 259A (Kao), the problem of sodium percarbonate stability in the presence of hydrated crystalline zeolites is solved by the use of an amorphous or partially crystalline aluminosilicate (0–75% crystallinity) or by the use of a partially calcium- or magnesium-exchanged material. However, use of such special aluminosilicates is clearly less convenient, and probably more expensive, than the use of the widely available crystalline zeolite 4A.

Laundry treatment products in the form of two-compartment sachets containing bleaching detergent compositions are described in the art. One such product, containing sodium perborate, is sold commercially in Italy.

US 4 410 441 discloses a two-compartment sachet of water-insoluble material for sequential dosing of particulate detergent ingredients to a wash liquor. One compartment contains a non-bleaching detergent composition, while the other compartment contains sodium perborate tetrahydrate. Release into the wash liquor is by leaching out through water-insoluble water-permeable sachet walls.

GB 1 538 744 (Interox) discloses bleaching compositions containing diacyl peroxides which, according to a passing reference, can be isolated from alkaline surfactants by enclosure in a flexible sachet which may also contain sodium perborate or sodium percarbonate.

GB 1 505 274 (Colgate-Palmolive) discloses detergent compositions in the form of a plurality of small dosage units, for example sachets but preferably and specifically tablets, containing different ingredients that can be dosed individually by the consumer. A detergent tablet system is described (Example 6) consisting of a detergent tablet (surfactant, builders, fluorescer, colourant), a builder tablet (additional builder), and a bleach tablet (sodium percarbonate and nonionic surfactant).

Bleaching detergent compositions contained in water-soluble sachets are also disclosed in the art, for example, in US 3 322 764 and US 3 186 869 (Friedman) and EP 79 248A.

There is a problem associated with the packing of detergent compositions containing sodium perborate in sachets of polyvinyl alcohol film, otherwise the most popular film material for water-soluble sachets: polyvinyl alcohol tends to be insolubilised by the borate ions generated in the wash liquor by decomposition of the sodium perborate, so that the sachet can become insufficiently soluble to release its contents during the wash cycle; or at least can leave unpleasant undissolved residues among the washed fabrics. EP 79 712A (Clorox) discusses this problem and suggests various modifications of the polyvinyl alcohol film material itself in order to increase its solubility in the presence of borate ions.

GB 836 108 (Henkel) discloses a bleaching detergent composition containing a percompound (preferably and specifically sodium perborate) and an activator. The activator, and if desired the percompound, can be separated from the remaining ingredients by wrapping in a water-soluble film.

A product now commercially available in France consists of a phosphate-built detergent powder containing sodium percarbonate sealed into a single-compartment sachet of water-soluble polyvinyl alcohol. Each sachet is provided with a small number of pinholes so that any oxygen generated by percarbonate decomposition can escape without bursting the sachet. A zeolite-built variant recently introduced by the same manufacturer, however, contains no sodium percarbonate.

EP 253 566A (Procter & Gamble) discloses multilayer sachets (water-soluble polyethylene oxide film with outer covering of water-permeable nonwoven fabric) containing bleaching detergent compositions. Some two-compartment sachets are disclosed, but, unless organic peracids are present, the contents of all compartments are identical. No products containing both zeolite and sodium percarbonate are disclosed.

DEFINITION OF THE INVENTION

The present invention provides a laundry treatment product in the form of a sachet capable of releasing its contents into the wash liquor during the laundry process, the sachet containing a particulate bleaching detergent composition and having at least two compartments, wherein a first compartment contains sodium percarbonate, optionally in admixture with other compatible detergent ingredients, and a second compartment contains other detergent ingredients.

According to a first preferred embodiment of the invention, the sachet is composed of water-insoluble, preferably water-permeable sheet or film material and is closed by one or more seals sensitive to water and/or mechanical agitation.

According to a second preferred embodiment of the invention, the sachet is composed of water-soluble or water-dispersible film material, more preferably polyvinyl alcohol film.

Preferably the contents of the second compartment include a water-insoluble alkali metal aluminosilicate builder, more preferably a crystalline zeolite.

DETAILED DESCRIPTION OF THE INVENTION

The sachet product of the invention contains a particulate bleaching detergent composition containing sodium percarbonate as an essential ingredient.

The present invention provides a solution to the problem of sodium percarbonate instability, particularly in the presence of aluminosilicates. In the second preferred embodiment in which the sachet is of water-soluble film material, the invention simultaneously solves the problem of borate ion insolubilisation of water-soluble sachet wall material, by providing a product in which perborate is replaced by percarbonate and in which the percarbonate is segregated from other ingredients that might have a detrimental effect on its stability. The segregation is achieved by means of sacheting and compartmentalisation, while the solubility of the sachet material is not adversely affected by the sachet contents.

The product of the invention also has all the recognised advantages of the sachet: convenience, lack of contact of the contents with the hands, lack of wastage or underdosing.

The detergent composition

The detergent composition contained in the sachet product of the invention contains sodium percarbonate as an essential ingredient. Sodium percarbonate is suitably present in an amount of from 5 to 30 wt %, preferably from 10 to 20 wt %.

Other essential ingredients of the detergent composition are one or more detergent-active compounds (surfactants), and one or more detergency builders; and, preferably, a bleach precursor. Any other suitable non-interfering ingredients that contribute to wash performance or provide fabric treatment benefits may of course be included.

The bleach activator (bleach precursor)

Preferably the detergent composition also contains an activator for the sodium percarbonate, in order to improve bleaching performance at the lower wash temperatures now favoured. Bleach activators, also referred to as bleach precursors, have been widely disclosed in the art. Suitable precursors include peracetic acid precursors, of which a preferred example is tetraacetylethylene diamine, now in widespread commercial use in conjunction with sodium perborate.

The novel quaternary ammonium and phosphonium bleach pre cursors disclosed in US 4 751 015 and US 4 818 426 and our copending unpublished European Patent Application No. 90 201 338.2 are also of great interest. Especially preferred are peroxycarbonic acid precursors, in particular cholyl-4-sulphophenyl carbonate. Also of interest are peroxybenzoic acid precursors, in particular, N,N,N-trimethylammonium toluoyloxy benzene sulphonate; and the cationic bleach precursors disclosed in EP 284 292A and EP 303 520A (Kao).

Our copending application of even date claiming the priority of British Patent Applications Nos. 89 19120.9 (filed on 23 Aug. 1990) and 89 27433.6 (filed on 5 Dec. 1990) describes and claims a laundry treatment product in sachet form containing a particulate laundry treatment composition comprising a quaternary ammonium- or phosphonium-substituted bleach precursor.

The molar ratio of percarbonate to precursor may suitably range from 0.5:1 to 20:1, preferably from 1:1 to 10:1.

If desired, a bleach stabiliser (heavy metal sequestrant), for example, a salt of ethylenediaminetetracetic acid (EDTA) or ethylenediamine tetramethylenephosphonic acid (EDTMP or Dequest (Trade Mark)) may be present.

The detergent-active compound

The detergent composition will also contain, as essential ingredients, one or more detergent-active compounds which may be chosen from soap and non-soap anionic, cationic, nonionic, amphoteric and zwitterionic detergent-active compounds, and mixtures thereof.

Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Synthetic anionic surfactants are well known to those skilled in the art. Examples include alkylbenzene sulphonates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; alkyl ether sulphates; olefin sulphonates; alkane sulphonates; alkyl xylene sulphonates; dialkyl sulphosuccinates; and fatty acid ester sulphonates.

It may also be desirable to include one or more soaps of fatty acids. These are preferably sodium soaps derived from naturally occurring fatty acids, for example, the fatty acids from coconut oil, beef tallow, sunflower or hardened rapeseed oil.

Suitable nonionic detergent compounds which may be used include in particular the reaction products of compounds having a hydrophobic group and a reactive hydrogen atom, for example, aliphatic alcohols, acids, amides or alkyl phenols with alkylene oxides, especially ethylene oxide either alone or with propylene oxide.

Specific nonionic detergent compounds are alkyl ($C_{6-22}$) phenol-ethylene oxide condensates, the condensation products of linear or branched aliphatic $C_{8-20}$ primary or secondary alcohols wih ethylene oxide; products made by condensation of ethylene oxide with the reaction products of propylene oxide and ethylenediamine; and alkylpolyglycosides. Other so-called nonionic detergent compounds include long-chain tertiary amine oxides, tertiary phosphine oxides, and dialkyl sulphoxides.

Especially preferred are the primary and secondary alcohol ethoxylates, especially the $C_{12-15}$ primary and secondary alcohols ethoxylated with an average of from 5 to 20 moles of ethylene oxide per mole of alcohol.

The total amount of surfactant present will generally range from 2 to 50 wt %, preferably from 5 to 40 wt %. Detergent compositions suitable for use in most automatic fabric washing machines generally contain anionic non-soap surfactant, or nonionic surfactant, or combinations of the two in any ratio, optionally together with soap.

The detergency builder

The detergent composition will also contain a detergency builder, suitably in an amount of from 5 to 80 wt %, preferably from 15 to 80 wt % and more preferably from 20 to 60 wt %.

The invention is especially applicable to compositions containing aluminosilicate builders, more especially crystalline alkali metal aluminosilicates such as zeolite A which contain large amounts of relatively mobile water. Especially preferred are alkali metal (preferably sodium) aluminosilicates, which may suitably be incorporated in amounts of from 5 to 60 wt % (anhydrous basis) of the composition, and may be either crystalline or amorphous or mixtures thereof, but are preferably crystalline. These materials have the general formula:

$$0.8\text{–}1.5\ Na_2O.Al_2O_3.8\text{–}6\ SiO_2$$

These materials contain some bound water and are required to have a calcium ion exchange capacity of at least 50 mg CaO/g. The preferred sodium aluminosilicates contain 1.5–3.5 $SiO_2$ units (in the formula above). Both the amorphous and the crystalline materials can be prepared readily by reaction between sodium silicate and sodium aluminate, as amply described in the literature.

Suitable crystalline sodium aluminosilicate ion-exchange detergency builders are described, for example, in GB 1 429 143 (Procter & Gamble). The preferred sodium aluminosilicates of this type are the well-known commercially available zeolites A and X, and mixtures thereof. Also of interest is the novel zeolite P described and claimed in EP 384 070A.

Other builders may also be included in the detergent composition if necessary or desired: suitable organic or inorganic water-soluble or water-insoluble supplementary builders will readily suggest themselves to the skilled detergent formulator. Inorganic builders that may be present include alkali metal (generally sodium) carbonate; while organic builders include polycarboxylate polymers such as polyacrylates, acrylic/maleic copolymers, and acrylic phosphinates; monomeric polycarboxylates such as citrates, gluconates, oxydisuccinates, glycerol mono-, di- and trisuccinates, carboxymethyloxysuccinates, carboxymethyloxymalonates, dipicolinates, hydroxyethyliminodiacetates; and organic precipitant builders such as alkyl- and alkenylmalonates and succinates, and sulphonated fatty acid salts.

Especially preferred supplementary builders are polycarboxylate polymers, more especially polyacrylates and acrylic/maleic copolymers, suitably used in amounts of from 0.5 to 15 wt %, especially from 1 to 10 wt %, of the detergent composition; and monomeric polycarboxylates, more especially citric acid and its salts, suitably used in amounts of from 3 to 20 wt %, more preferably from 5 to 15 wt %.

The invention, although especially applicable to aluminosilicate-built compositions, also includes within its scope compositions having other builder systems.

Inorganic builders that may be present include sodium carbonate, if desired in combination with a crystallisation seed for calcium carbonate, as disclosed in GB 1 437 950. Inorganic phosphate builders, for example, sodium orthophosphate, pyrophosphate and tripolyphosphate, may also be present. Organic builders that may be present include all the materials listed above as possible supplementary builders to aluminosilicates. This list is not intended to be exhaustive.

Preferred detergent compositions used in the present invention do not contain more than 5 wt % of inorganic phosphate builders, and are desirably substantially free of phosphate builders. However, as indicated above, phosphate-built compositions are also within the scope of the invention.

Other ingredients

The detergent composition may also contain one of the detergency enzymes well-known in the art for their ability to degrade and aid in the removal of various soils and stains. Suitable enzymes include the various proteases, cellulases, lipases, amylases, and mixtures thereof, which are designed to remove a variety of soils and stains from fabrics. Examples of suitable proteases are Maxatase (Trade Mark), as supplied by Gist-Brocades N. V., Delft, Holland, and Alcalase (Trade Mark), Esperase (Trade Mark) and Savinase (Trade Mark), as supplied by Novo Industri A/S, Copenhagen, Denmark. Detergency enzymes are commonly employed in the form of granules or marumes, optionally with a protective coating, in amounts of from about 0.1% to about 3.0% by weight of the composition.

The detergent composition may also contain a fluorescer (optical brightener), for example, Tinopal (Trade Mark) DMS or Tinopal CBS available from Ciba-Geigy AG, Basel, Switzerland. Tinopal DMS is disodium 4,4'-bis-(2-morpholino-4-anilino-s-triazin-6- ylamino) stilbene disulphonate; and Tinopal CBS is disodium 2,2'-bis-(phenyl-styryl) disulphonate.

An antifoam material is advantageously included in the detergent composition, especially if the sachet product is primarily intended for use in front-loading drum-type automatic washing machines. Suitable antifoam materials are usually in granular form, such as those described in EP 266 863A. Such antifoam granules typically comprise a mixture of silicone oil, petroleum jelly, hydrophobic silica and alkyl phosphate as antifoam active material, sorbed onto a porous absorbent water-soluble carbonate-based inorganic carrier material. Antifoam granules may be present in any amount up to 5% by weight of the detergent composition.

It may also be desirable to include in the detergent composition an alkali metal silicate, particularly sodium ortho-, meta- or preferably neutral or alkaline silicate. The presence of such alkali metal silicates at levels, for example, of 0.1 to 10 wt %, may be advantageous in providing protection against the corrosion of metal parts in washing machines, besides providing some measure of building and giving processing benefits.

Further ingredients which can optionally be employed in the detergent composition include antiredeposition agents such as sodium carboxymethylcellulose, polyvinyl pyrrolidone and the cellulose ethers such as methyl cellulose and ethyl hydroxyethyl cellulose; fabric-softening agents; perfumes; pigments, colourants or coloured speckles.

Inorganic salts, such as sodium and magnesium sulphate, may if desired be present as filler materials in amounts up to 40% by weight of the detergent composition; however as little as 10% or less by weight of the composition of sodium sulphate, or even none at all, may be present, and that is generally preferred in the interests of compactness. The inertness of these salts, however, gives them some utility as diluents.

Bulk density

Preferably the bulk density of the detergent composition is at least 400 g/l, more preferably at least 500 g/l. Obviously, the higher the bulk density, the smaller the sachet can be, and the lower the packaging costs and space requirements for storage. A sachet is also an especially convenient way of introducing a high-bulk-density detergent powder into the wash liquor, because it avoids any dispensing or dispersion problems associated with a more compact powder.

Water-insoluble sachets

A water-insoluble sachet in accordance with the first preferred embodiment of the invention may be of the closed, water-permeable type that relies on leaching out by the wash liquor for release of its contents. Alternatively, the sachet may be provided with a seal that will open under washing machine conditions, by the action of water or of mechanical agitation or both; for example, as disclosed in EP 1 500A, EP 246 897A, or EP 3I2 277A.

Opening sachets may be of either water-permeable or water-impermeable material, water-permeable material being preferred. Suitable materials include paper, woven and non-woven fabrics, films of natural or synthetic origin, or combinations thereof having a base weight between 1 and 100 $g/m^2$. Example of these are disclosed, for example, in EP-A-246 897A and include polyamide, polyester, polyacrylate, cellulose acetate, polyethylene, polyvinyl chloride, polypropylene, cellulosic fibres, regenerated cellulosic fibres, and mixtures thereof. Preferred materials include cellulose/polyester mix fabrics, and Manila/viscose non-woven paper, such as is used for sausage casing. Manila/viscose paper having a base weight from about 5 to 40 $g/m^2$, especially from 10 to 30 $g/mb^2$, is particularly preferred because of its greater wet strength than many other papers, especially at elevated temperatures.

It is especially preferred that the seals are composed of a water-labile component and a heat-sealable component, as described and claimed in the aforementioned EP 246 897A. These seals are sensitive at wash temperatures to the combination of water and mechanical agitation encountered in the washing machine environment, and open to release the sachet contents. Preferably, the water-labile component is selected from polyvinyl pyrrolidone, polyvinyl alcohol and dextrin, while the heat-sealable component is selected from vinyl acetate homopolymers, vinyl acetate/ethylene copolymers and polyacrylic acid. An especially preferred combination is a mixture of polyvinyl pyrrolidone and vinyl acetate-/ethylene copolymer. Another preferred sealant, based on polyvinyl pyrrolidone, is disclosed in EP 3 12 277A.

Water-soluble sachets

It is also within the scope of the invention for the sachet substrate itself to be one that dissolves or disintegrates in the wash liquor. Especially preferred are sachets of water-soluble film.

A water-soluble sachet in accordance with the second preferred embodiment of the invention is composed of a film material capable of dissolving in water at all temperatures used in domestic laundry operations within a time such that the contents will be released at a sufficiently early stage in the wash cycle. Such film materials are well-known in the art and include polyvinyl alcohols and partially hydrolysed polyvinyl acetates, alginates, cellulose ethers such as carboxymethylcellulose and methylcellulose, polyacrylates, polyethylene oxide, and combinations of these.

The film material is preferably thermoplastic so that it can be closed by heat-sealing, but that is not essential because a thermoplastic coating may be provided at the areas where seals are to be formed. Seals may also be made by solvent welding.

Sachet arrangement (compartmentalisation)

In the product of the invention, the detergent composition is divided into two (or more) powder components which are packed separately in the appropriate compartments of the sachet. The distribution of the various ingredients among these components may be done in any suitable way, provided that the sodium percarbonate is segregated from any ingredient, particularly zeolite, that would adversely affect its stability.

If a bleach precursor is present, the sodium percarbonate and the precursor may advantageously be packed in separate compartments to avoid premature reaction between them, leading to loss of bleach efficacy, and possible attack on the sachet wall material by the peracid generated; but such separation is not essential with all precursors.

If desired, sodium percarbonate alone may be packed in the first compartment, and all other ingredients packed in the second compartment. In this embodiment, the second compartment will generally be substantially larger than the first.

It may be more convenient if the first compartment contains sodium percarbonate plus other ingredients with which there is no adverse interaction; while the remaining ingredients are packed in the second compartment. It may then be possible to use a sachet having compartments equal in size, which may give manufacturing advantages.

If desired, the contents of the two compartments may be differently coloured or speckled to enhance consumer appeal. For example, the sodium percarbonate may be admixed with blue pigment, or with blue speckles of sodium carbonate or other particulate diluent, while the contents of the other compartment are white.

A single two-compartment unit may represent either a single dose suitable for an average washload, or, preferably, a submultiple dose to allow the consumer greater flexibility to vary the amount used depending on the size and degree of soiling of the washload. The preferred unit size is the half dose, that is to say, half the amount judged to be required for an average washload; the consumer can then choose to use a single unit for a lightly soiled or small wash, two for an average wash, and three for an exceptionally large or heavily soiled load, without the inconvenience of having to deal with a large number of very small units.

If desired, a plurality of half-dose units may be joined together in an easily separable manner, for example, via a perforated region, to form a multiple sachet system from which units may be detached as required.

In general, it is preferred that the two compartments themselves should not be readily separable, so that they are always used together in the correct proportions. That is especially important when a bleach precursor is present in the compartment that does not contain the sodium percarbonate.

It is, however, also possible to envisage sachet arrangements in which bleaching ingredients are segregated from the remainder of the composition, possibly using three compartments (one for sodium percarbonate, one for bleach precursor, one for remaining components). It might then be appropriate to provide for detachment of the compartments containing bleaching ingredients so as to allow the consumer to carry out non-bleaching washes, or washes containing additional bleach.

The product of the invention may thus be presented in many different ways, some allowing the consumer to vary the proportions in which different ingredients are used in the wash, others always retaining a fixed proportionality between the various components. The examples described here are not intended to be limiting, as the skilled reader will readily be able to think of other combinations.

Sachet construction

The sachet may be of any suitable shape and construction. The most convenient shapes from the viewpoints of both manufacture and packing are square and rectangular, but any other desired shape is also within the scope of the invention.

Preferred sachets according to the invention contain two compartments, in order to avoid undue complexity, but it is also within the scope of the invention for three or more to be present if additional segregation is required.

In a two-compartment sachet in accordance with the invention, the compartments may, for example, be side-by-side, joined by a common seal, or back-to-back, joined by a common wall. The former arrangement is more suitable if the two compartments are to be very different in size, and is also easier to make. Other multicompartment arrangements are disclosed in EP 236 136A.

The relative sizes of the two (or more) compartments can be tailored to match the proportions of the total contents to be accommodated in each, and the optimum shape of the sachet chosen accordingly. For example, if the first compartment of a two-compartment sachet is to contain sodium percarbonate alone while all other ingredients are in the second compartment, the second compartment will generally be substantially larger than the first; and a convenient shape for the sachet is a rectangle with one long and one much shorter edge, the first compartment being in the form of a narrow strip along one of the short edges. As indicated previously, it is also within the scope of the invention for the distribution of contents between the two compartments to be less unequal, other non-interfering ingredients being packed together with the sodium percarbonate, and then a rectangle with less unequal edge lengths may be a more appropriate shape.

The size of the sachet will of course depend on the amount of detergent composition it is intended to contain, and that in turn will depend on the type of formulation, on the wash conditions under which it is intended to be used, and whether the sachet is intended to be a single dose or a half-dose (or other submultiple). The volume fill of the sachet may be anything up to 100%, and is preferably at least 20%, and may advantageously be at least 50% when an especially compact product is desired; of course the volume fill of each compartment need not be the same.

The total amount of detergent composition in the sachet product of the invention may vary, for example, from 10 to 150 g for a half dose (20 to 300 g for a single dose), depending on the type and size of washing machine in which it is intended to be used.

Delivery of sachet contents

It is generally preferred that the sachet system should be designed such that the contents will be released at or very shortly after the time of addition to the wash liquor. It is especially preferred that substantially complete delivery of the contents should occur within at most 3 minutes, more preferably at most 1 minute from the time of addition to the wash liquor.

It may sometimes be desirable, however, for the sachet systems to be designed such that at least one compartment or sachet thereof gives a delayed or controlled release of the contents. Suitable sachet structures are described in EP 236 136A.

DESCRIPTION OF THE DRAWINGS

The invention will now be described in more detail, by way of example only, with reference to the accompanying drawing, which is a plan view of a laundry treatment product of the invention in the form of a single two-compartment sachet.

Referring now to the accompanying drawings, a sachet 1 is of generally rectangular shape having a long edge 2 (typically about 180–200 mm) and a substantially shorter edge 3 (typically about 90–110 mm). The sachet is divided by a seal 4 into a smaller first compartment 5 typically having a length of about 60–80 mm, and a larger second compartment 6, typically having a length of about 100–140 mm. The sachet may be formed from two sheets of material heat-sealed together around the edges 2 and 3 and along the line 4.

The first compartment 5 contains particulate material 7 consisting of or including sodium percarbonate, while the second compartment 6 contains a different particulate material 8 containing other detergent ingredients.

The sachet may consist of water-insoluble material, for example, sausage casing paper. The edge seals 2 and 3, and optionally the inter-compartment seal 4, may then be formed of a material sensitive to water and mechanical agitation, for example, a mixture of polyvinyl pyrrolidone and vinyl acetate/ethylene copolymer.

Alternatively, the sachet may consist of water-soluble film material, for example, polyvinyl alcohol; the seals 2, 3 and 4 need not be of an opening type.

The sachet product of the drawing represents a half-dose for use in an automatic washing machine. Thus two such products should be used for a washload of average size and degree of soiling. In use, two sachets are placed in the drum of the machine with the soiled wash load before the start of the wash cycle. Early in the laundry process the sachets are either opened at the seals, or ruptured and subsequently dissolved, to deliver their contents to the wash liquor.

If desired, the sachet products may be presented in joined pairs each representing a single dose, a line of perforations being provided between the two individual sachets so that they can be separated if the consumer so wishes. Typically, the sachets are joined side-by-side along the longer edge by a perforated common seal or seam.

EXAMPLES

The invention will now be illustrated by the following non-limiting Examples

EXAMPLE 1

A particulate detergent composition was prepared in the form of two components A and B, as described below.

| | Weight % |
|---|---|
| Component A | |
| Sodium percarbonate | 14.67 |
| Sodium carbonate | 11.93 |
| Antifoam granules | 2.77 |
| Nonionic surfactant | 2.21 |
| Perfume | 0.11 |
| Total Component A | 31.69 |
| Component B | |
| B1 Spray-dried base powder | |
| Linear alkylbenzene sulphonate | 9.97 |
| Nonionic surfactant | 2.21 |
| Zeolite (anhydrous basis) | 27.69 |
| Acrylic/maleic copolymer | 4.44 |
| Sodium carbonate | 2.21 |
| Sodium silicate | 4.44 |
| Fluorescer | 0.20 |
| Minor ingredients | 0.86 |
| Salts and water | 10.59 |
| | 62.61 |
| B2 Post-dosed ingredients | |
| TAED granules (83% active) | 4.81 |
| Enzyme granules | 0.67 |
| Perfume | 0.22 |
| Total Component B | 68.31 |

Component A was prepared by mixing the solid ingredients, and spraying on the nonionic surfactant and perfume. Its bulk density was about 900 g/liter.

Component B was prepared by spray-drying an aqueous slurry to form the base powder B1, then admixing the TAED granules and enzyme granules, and spraying on perfume. The bulk density of Component B was about 550 g/liter.

Half-dose laundry treatment products as described above with reference to the drawing were prepared. The sachets were composed of manila/viscose sausage casing paper having a base weight of 21 g/m$^2$ (SC21 ex Crompton Ltd, UK). The paper was coated, and subsequently heat-sealed, with a resin sealant comprising a mixture of polyvinyl pyrrolidone, vinyl acetate/ethylene copolymer, and water.

The smaller compartment (Compartment A) was filled with 19 g of Component A, and the larger compartment (Compartment B) with 41 g of Component B. The sachets were closed by heat-sealing, as indicated above. The dimensions of the closed sachets were 190 mm×100 mm.

Two sachets per wash were used to wash 2.5 kg of mixed fabrics (acrylic sheeting, polyester/cotton sheeting, terry towelling etc) in a Philips washing machine, in 12° (French) hard water using the 40° C. wash cycle. The sachets released their contents within 3 minutes and excellent detergency and bleaching results were obtained.

EXAMPLE 2

Sachet products, of identical shape and dimensions to those of Example 1, was prepared from a commercially available plasticised polyvinyl alcohol film having a thickness of 30 micrometers (TECHNOSOL (Trade Mark) C 101 ex Courtaulds plc, UK).

Each sachet was filled with Components A and B as described in Example 1, in the same amounts, and closed by heat sealing.

In use (two sachets per wash) under the wash conditions specified in Example 1, the sachets released their contents within 3 minutes. Similar detergency and bleaching results were obtained, and no residues of undissolved sachet material were detected on the washed fabrics.

EXAMPLE 3

Sachet products as described above in Example 2 were used to wash 2.5 kg loads of clean mixed fabrics (acrylic sheeting, polyester/cotton sheeting, cotton and terry towelling) in a Philips 921 washing machine, two sachets per wash being placed on top of the load. Two different wash cycles, both consisting only of a main wash, and both employing cold fill, were used:

(i) Low agitation (50% of duration of wash cycle), 40° C.;

(ii) High agitation (80% of duration of wash cycle), 60° C.

At the end of each wash, the load was examined for residues of undissolved polyvinyl alcohol. No residues were detected after either wash cycle.

EXAMPLE 4

In this experiment the storage stabilities of single- and double-compartment sachet products including sodium percarbonate were compared with the storage stabilities under the same conditions of otherwise identical sachets containing sodium perborate.

Sachet products of sausage casing paper (SC21 as previously described) were prepared as follows:

Comparative Example A: single compartment sachet containing a detergent composition as follows:

| | Parts by weight |
|---|---|
| Spray-dried base powder | |
| Linear alkylbenzene sulphonate | 9.97 |
| Nonionic surfactant | 2.21 |
| Zeolite (anhydrous basis) | 27.69 |
| Acrylic/maleic coplymer | 4.44 |
| Sodium carbonate | 2.21 |
| Sodium silicate | 4.44 |
| Fluorescer | 0.20 |
| Minor ingredients | 0.86 |
| Salts and water | 10.59 |
| Postdosed | |
| Sodium percarbonate | 14.67 |
| TAED granules (83% active) | 4.81 |
| Sodium carbonate | 11.38 |

Example 4: double compartment sachet containing in the smaller compartment the following composition:

| | |
|---|---|
| Sodium percarbonate | 14.67 |
| Sodium carbonate | 11.38 |

and in the larger compartment the following composition:

| | |
|---|---|
| Spray-dried base powder | |
| Linear alkylbenzene sulphonate | 9.97 |
| Nonionic surfactant | 2.21 |
| Zeolite (anhydrous basis) | 27.69 |
| Acrylic/maleic copolymer | 4.44 |
| Sodium carbonate | 2.21 |
| Sodium silicate | 4.44 |
| Fluorescer | 0.20 |
| Minor ingredients | 0.86 |
| Salts and water | 10.59 |
| Postdosed | |
| TAED granules (83% active) | 4.81 |

Comparative Example B: as Comparative Example A, but with 14.67 parts by weight of sodium perborate monohydrate instead of 14.67 parts by weight of sodium percarbonate.

Comparative Example C: as Example 4, but with 14.67 parts by weight of sodium perborate monohydrate instead of 14.67 parts of sodium percarbonate.

The sachets were stored openly, rather than in laminated packs; they were laid flat, not touching each other. After storage (under ambient conditions or under severe conditions −28° C. or 37° C. at 70% relative humidity) for 1 week, 2 weeks or 4 weeks, the bleach activity remaining was determined by available oxygen titration using potassium permanganate.

The results, expressed as residual available oxygen as a molar percentage of the theoretical value, were as shown in Table 1, and demonstrate the value of compartmentalisation in retarding the deactivation of sodium percarbonate to a rate comparable with that of sodium perborate.

TABLE 1

| | A | 4 | B | C |
|---|---|---|---|---|
| 28° C., 70% RH | | | | |
| 1 week | 71 | 89 | 100 | 86 |
| 2 weeks | 48 | 88 | 59 | 90 |
| 4 weeks | 29 | 80 | 55 | 79 |
| 37° C., 70% RH | | | | |
| 1 week | 23 | 83 | 62 | 87 |
| 2 weeks | 11 | 75 | 46 | 69 |
| 4 weeks | 7 | 75 | 35 | 77 |

EXAMPLE 5

An experiment similar to Example 4 was carried out using water-soluble sachets composed of the polyvinyl alcohol film used in earlier Examples. The compositions used were as follows:

Comparative Example D: single compartment sachet containing a detergent composition as in Comparative Example A.

Example 5: double compartment sachet containing the two compositions as in Example 4.

Comparative Example E: as Comparative Example D, but with 14.67 parts by weight of sodium perborate monohydrate instead of 14.67 parts by weight of sodium percarbonate.

Comparative Example F: as Example 5, but with 14.67 parts by weight of sodium perborate monohydrate instead of 14.67 parts of sodium percarbonate.

The storage results were as shown in Table 2.

TABLE 2

| | D | 5 | E | F |
|---|---|---|---|---|
| Ambient | | | | |
| 1 week | 90 | 92 | 85 | 92 |
| 2 weeks | 49 | 92 | 84 | 100 |
| 4 weeks | 30 | 82 | 63 | 93 |
| 37° C., 70% RH | | | | |
| 1 week | 38 | 88 | 78 | 89 |
| 2 weeks | 13 | 83 | 34 | 90 |

EXAMPLE 6

In the following experiment, the effects of sodium percarbonate and sodium perborate on polyvinyl alcohol film under wash conditions were compared.

A non-bleaching detergent composition having the following formulation was prepared:

| | Parts by weight |
|---|---|
| Spray-dried base powder | |
| Linear alkylbenzene sulphonate | 9.97 |
| Nonionic surfactant | 4.42 |
| Zeolite (anhydrous basis) | 27.69 |
| Acrylic/maleic copolymer | 4.44 |
| Sodium carbonate | 2.21 |
| Sodium silicate | 4.44 |
| Fluorescer | 0.20 |
| Minor ingredients | 0.86 |
| Salts and water | 10.59 |
| Postdosed | |
| Antifoam granules | 2.77 |
| | 67.59 |

Half-dose sachet products were prepared from the polyvinyl alcohol film used in Example 2, as follows:

Comparative Example G: single-compartment sachet containing:

| | g |
|---|---|
| Detergent composition | 40.55 |
| Sodium carbonate | 6.83 |

Comparative Example H: two-compartment sachet as described in previous Example containing:

| | g |
|---|---|
| Compartment A | |
| Sodium perborate monohydrate | 8.80 |
| Sodium carbonate | 6.83 |
| Compartment B | |
| Detergent composition | 40.55 |
| TAED granules | 2.88 |

Example 6: two compartment sachet as described in previous Example, containing:

| | g |
|---|---|
| Compartment A | |
| Sodium percarbonate | 8.80 |
| Sodium carbonate | 6.83 |
| Compartment B | |
| Detergent composition | 40.55 |
| TAED granules | 2.88 |

The products (two sachets per wash) were used to wash 2.5 kg loads of clean mixed fabrics (acrylic sheeting, polyester/cotton sheeting, cotton and terry towelling) in a Philips 921 washing machine, the products being placed on top of the washload. Two different wash cycles, both consisting only of a main wash, and both employing cold fill, were used:

(i) Low agitation (50% of duration of wash cycle), 40° C.;

(ii) High agitation (80% of duration of wash cycle), 60° C.

At the end of each wash, the load was examined for residues of undissolved polyvinyl alcohol. The results were as follows:

| | Low agitation 40° C. | High agitation 60° C. |
|---|---|---|
| Comp Example G | No residues | No residues |

-continued

| | Low agitation 40° C. | High agitation 60° C. |
|---|---|---|
| Comp Example H | Substantial gel lumps, on acrylic and terry towelling fabrics | Some gel lumps, mainly on acrylic, but less (and smaller) than at low agitation |
| Example 6 | No residues | No residues |

EXAMPLE 7 Comparative Example J, K, L, M, N

In this experiment, the storage stability of a sachet product of the invention was compared with the storage stability of a loose powder of identical total composition: and a similar comparison was carried out for a control system containing sodium perborate monohydrate instead of sodium percarbonate.

A high bulk density detergent powder of the formulation given below was prepared by spray-drying all components except the speckles, enzyme and perfume; granulating and densifying in a Fukae (Trade Mark) FS-122 high-speed mixer/granulator as described in EP 340 013A (Unilever Case C.3235); then admixing the enzyme, speckles and perfume.

| | wt % |
|---|---|
| Linear alkylbenzene sulphonate | 25.0 |
| Nonionic surfactant | 2.0 |
| Soap | 1.0 |
| Zeolite 4A (anhydr.) | 35.0 |
| Water with zeolite | 9.99 |
| Sodium silicate | 4.0 |
| Acrylate/maleate copolymer | 1.0 |
| Sodium sulphate | 1.77 |
| Fluorescer | 0.18 |
| Sodium carboxymethyl cellulose | 0.9 |
| Sodium carbonate | 15.5 |
| Total added water | 2.0 |
| Speckles | 0.8 |
| Enzyme | 0.6 |
| Perfume | 0.25 |
| | 100.00 |

Water-insoluble sachets of the material described in Example 1, each having two compartments of equal size and having dimensions of 80×60 mm were prepared, filled with the components given below, then closed by heat sealing at 185° C./45 psi for 1 second.

EXAMPLE 7

| | | |
|---|---|---|
| Compartment A: | TAED granules | 1.37 g |
| | Dequest 2047 | 0.11 g |
| | Detergent composition | 28.00 g |
| Compartment B: | Sodium percarbonate | 6.96 g |
| Comparative Example J: | | |
| Compartment A: | as in Example 7 | |
| Compartment B: | Sodium perborate monohydrate | 4.44 g |

The compositions were chosen to deliver equal peracid concentrations into the wash liquor.

Bleach assessment was carried out by washing cotton test cloths stained with tea, wine and blackberry, without a ballast load, in a National (Trade Mark) twin-tub top-loading washing machine containing 35 liters of 7° (French) hard water (5° Ca, 2° Mg), using a wash temperature of 25° C. and a wash time of 10 minutes. The difference (R) between the reflectance values at 460 nm of the test cloths before and after the wash procedure was used as a measure of bleach performance.

Peracid determination was also carried out, using a standard thiosulphate titration method.

The products were tested after 10 days' storage in open cartons at 37° C/70% relative humidity. As controls, the same tests were performed on freshly made loose powder, and on loose powder stored under the same conditions as the sachet products:

Comparative Example K:

| Loose powder (fresh): | |
|---|---|
| TAED granules | 1.37 g |
| Dequest 2047 | 0.11 g |
| Detergent composition | 28.00 g |
| Sodium percarbonate | 6.96 g |

Comparative Example L:

| Loose powder (fresh): | |
|---|---|
| TAED granules | 1.37 g |
| Dequest 2047 | 0.11 g |
| Detergent composition | 28.00 g |
| Sodium perborate monohydrate | 4.44 g |

Comparative Example M:

The powder of Comparative Example K after storage.

Comparative Example N:

The powder of Comparative Example L after storage.

The results, presented in Table 3, show that the benefit of segregation is substantially greater in the TAED/percarbonate system than in the TAED/perborate system.

TABLE 3

Examples 7, J, K, L, M, N - TAED/percarbonate and TAED/perborate

| Example | Peracid (%) | Reflectance changes (R 460*) Tea | Wine | Blackberry |
|---|---|---|---|---|
| Fresh powder | | | | |
| K (percarbonate) | 100 | 1.0 | 8.9 | 10.8 |
| L (perborate) | 100 | 0.6 | 8.5 | 9.5 |
| Sachet after storage | | | | |
| 7 (percarbonate) | 98 | 1.7 | 8.0 | 10.1 |
| J (perborate) | 82 | (−0.1) | 9.2 | 10.4 |
| Loose powder after storage | | | | |
| M (percarbonate) | 76 | (−1.1) | 8.0 | 8.7 |
| N (perborate) | 85 | 0.1 | 8.4 | 8.8 |

EXAMPLE 8 Comparative Example P and Q

A similar experiment was carried out using the cationic bleach precursor, cholyl-4-sulphophenyl carbonate (CSPC), instead of TAED.

This was used in the form of noodles having the following composition:

| | |
|---|---|
| Cholyl-4-sulphophenyl carbonate (75% active) | 82.0 |
| Palmitic acid | 8.3 |
| $C_{18}$, 21 EO nonionic surfactant | 8.7 |
| | 100.0 |

A two-compartment water-insoluble sachet as described in Example 7 was prepared and filled with the following components:

| | | |
|---|---|---|
| Compartment A: | CSPC noodles | 5.46 g |
| | Dequest 2047 | 0.11 g |
| | Detergent composition | 28.00 g |
| Compartment B: | Sodium percarbonate | 6.96 g |

Bleach assessment after storage was carried out as described in Example 7. For comparison, loose powder (Comparative Example P, fresh; Comparative Example Q, stored) was also assessed. The results, presented in Table 4, show the benefits of segregation in the CSPC/percarbonate system.

TABLE 4

| Examples 8, P, Q - CSPC/percarbonate | | | | |
|---|---|---|---|---|
| | Peracid | Reflectance changes (R 460*) | | |
| Example | (%) | Tea | Wine | Blackberry |
| Initial | | | | |
| P | 100 | 4.1 | 14.2 | 24.7 |
| Sachet after storage | | | | |
| 8 | 30 | 0.7 | 8.5 | 14.5 |
| Loose powder after storage | | | | |
| Q | — | (−0.5) | 7.9 | 9.1 |

We claim:

1. A laundry treatment product in a sachet form capable of releasing contents of the sachet into a wash liquor during laundering, the sachet containing a particulate bleaching detergent composition and having at least two compartments, wherein a first compartment contains sodium percarbonate, optionally in admixture with other compatible detergent ingredients, and a second compartment containing a bleach activator which is cholyl-4-sulphophenyl carbonate.

2. A laundry treatment product as claimed in claim 1, wherein the sachet is composed of Water-soluble or water-dispersible film material.

3. A laundry treatment product as claimed in claim 2, wherein the sachet is composed of polyvinyl alcohol film.

4. A laundry treatment product as claimed in claim 1, wherein the sachet is composed of water-insoluble water-permeable film or sheet material and is closed by one or more seals sensitive to water and/or mechanical agitation.

5. A laundry treatment product as claimed in claim 1, wherein the contents of the second compartment include a water-insoluble alkali metal aluminosilicate builder.

6. A laundry treatment product as claimed in claim 1, wherein the sachet comprises two compartments side-by-side joined by a common seal.

7. A laundry treatment product as claimed in claim 1, wherein the first compartment is free of bleach activator and the second compartment is free of sodium percarbonate.

* * * * *